Figure 1:
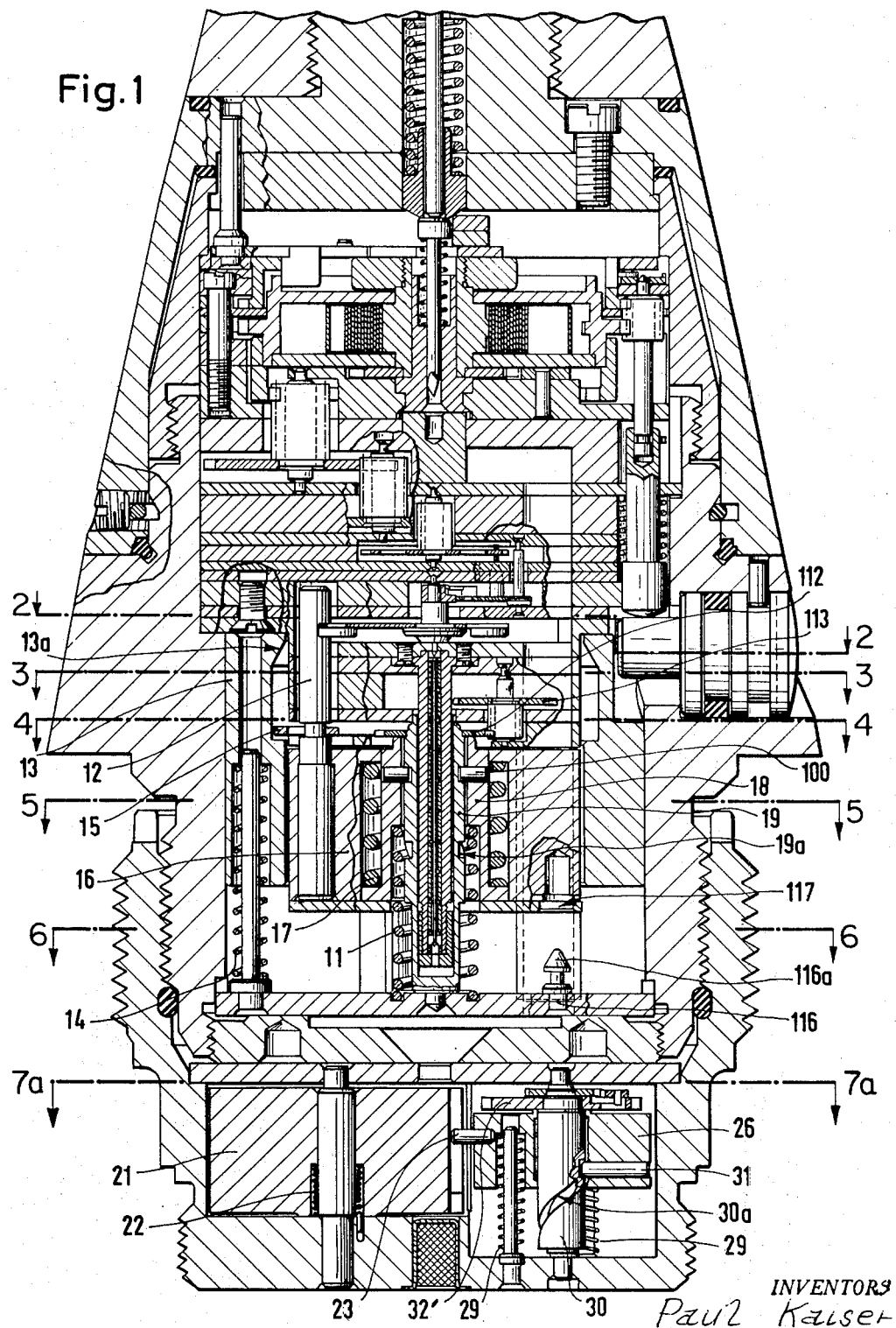

United States Patent

[11] 3,530,797

[72] Inventors Paul Kaiser,
    Schramberg, Wurttemberg;
    Josef Mueller, Schramberg-Sulgen,
    Wurttemberg, Germany
[21] Appl. No. 603,691
[22] Filed Dec. 21, 1966
[45] Patented Sept. 29, 1970
[73] Assignee Gebruder Junghans G.m.b.H.,
    Schramberg, Wurttemberg, Germany,
    a corporation of Germany
[32] Priority Dec. 22, 1965
[33] Germany
[31] J 29,687

[54] CLOCKWORK TIME FUZES
3 Claims, 9 Drawing Figs.

[52] U.S. Cl. ........................................... 102/84, 102/71
[51] Int. Cl. ........................................... F42c 9/00, F42c 9/02, F42c 9/04
[50] Field of Search ............................ 102/78, 83, 84, 82

[56] References Cited
UNITED STATES PATENTS
| | | | |
|---|---|---|---|
| 2,164,115 | 6/1939 | Lasserre | 102/84 |
| 3,170,404 | 2/1965 | Swaim et al. | 102/84 |
| 3,299,814 | 1/1967 | Junghans et al. | 102/84 |
| 3,316,841 | 5/1967 | McFann et al. | 102/82X |
| 3,337,701 | 8/1967 | Prebilic | 102/83X |
| 3,124,074 | 3/1964 | Kaiser et al. | 102/78 |

*Primary Examiner*—Benjamin A. Borchelt
*Assistant Examiner*—Thomas H. Webb
*Attorney*—Watson, Cole, Grindle and Watson ABSTRACT: A clockwork time fuze including an actuating mechanism, movement of which is controlled in part by a retarding means. An acceleration responsive mechanism is incorporated in series relation between the actuating means and a motor associated with the retarding means. The acceleration responsive means is operable to provide a first acceleration force transmitting condition responsive to relatively high acceleration so as to cause a relatively high rate of movement of the actuating means at least partially independent of the retarding means. The acceleration responsive means is also operable to provide a second acceleration force transmitting condition which is responsive to relatively low acceleration and which is operable to cause a relatively low movement of the actuating means, governed by the retarding means.

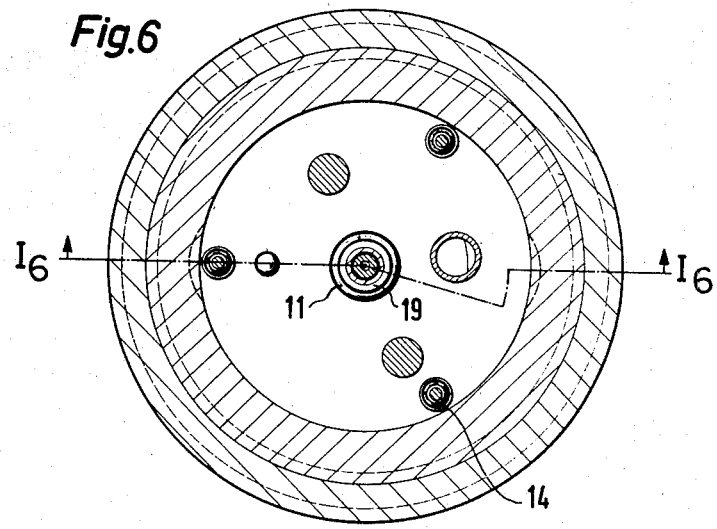

CLOCKWORK TIME FUZES

Clockwork time fuzes in which the clockwork controls the transport and safety devices, are known. Such safety means relate as a rule to continuance performance operative when the projectile is fired as to the fuze, in which a continuous weight is forced back against spring pressure and by return or back movement of the delay mechanism in and out. Such fuzes were heretofore only adaptable for a definite type of projectile.

The present invention has for its object to provide a fuze which can be universally used and applied, that is in projectiles having high as also low freely operable inertia forces whereby also it will be set for self and automatic inertia operation. It has utility also for artillery projectiles with high acceleration as well as rocket projectiles with extremely low acceleration.

In order to explain the essential features of the invention a clockwork fuze is described which in known manner as well as the mechanism as also the pellet carrier rotor is made safe by delay mechanism and inertia weights.

In accordance with the invention the safety of the occasional and exisitng acceleration of the projectile is automatic, in that in the power path from the inertia weight to the delay mechanism, a member or link is interposed, so that by high projectile acceleration the energy delivered directly from the inertia weight to the delay mechanism, by low projectile acceleration, a retardation will automatically set in the energy path. In a modified form of the essence of the invention a member is provided in the power path at the inertia weight to the delay mechanism, which at high projectile acceleration, the acceleration mechanism will be disconnected, by low projectile acceleration this disconnection will occur automatically.

When the anchor or armature of the clockwork, in known manner, seated by inertia pins on an inertia weight, is secured, then in a further feature of the invention a concentric inertia shell or collar is subjected to spring action, which with a spiral groove and pin guide is slidable on a stationary shaft, whereby between a ring-shaped inertia weight and a concentric inertia collar or shell, a strong spiral spring is provided. The inertia ring weight is adjustable by complete return movement by means of a pressure knob-headed pin.

Adjacent the pill or charge carrier-swing slide, an inertia weight can be provided in axial parallel relationship, and which in front on its shaft a loose gear wheel is provided as the first drive to the delay mechanism, as well as a rigid switch wheel and also a conical stop means which operates together with the switch wheel.

The rigid shaft of the clockwork armature safety device can preferably be constructed from the known safety tube of the axially arranged torsion rod spring which with its front end is mounted to bear in a bottom plate of the clockwork and which extends back rearwardly in the direction of bottom of the projectile.

Figure 2:
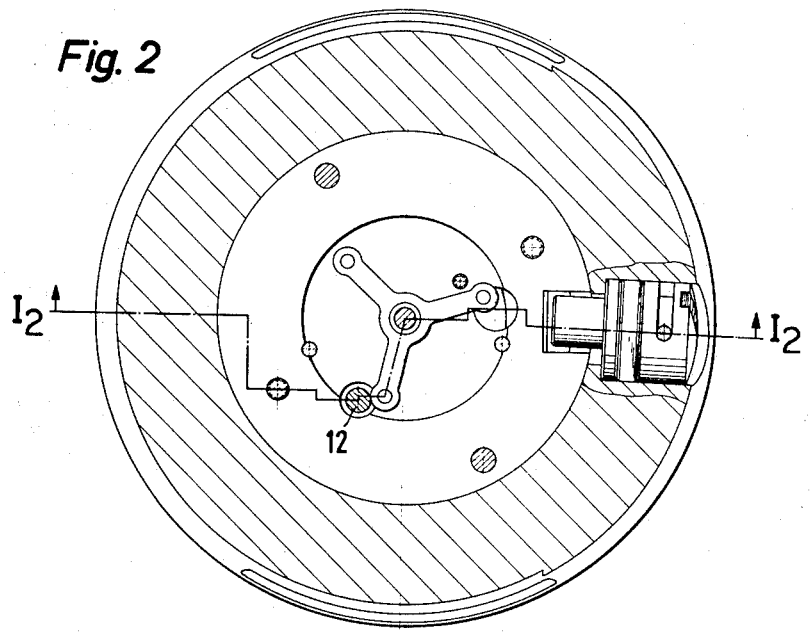
Figure 3:
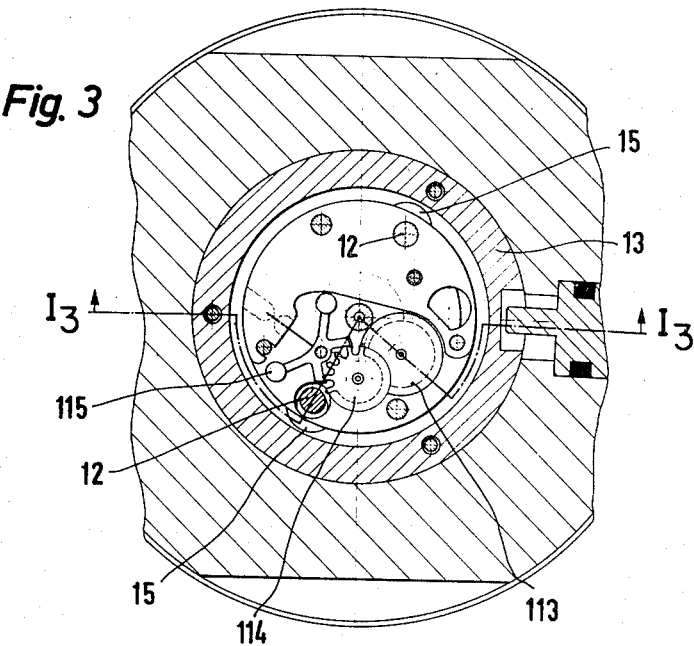
Figure 4:
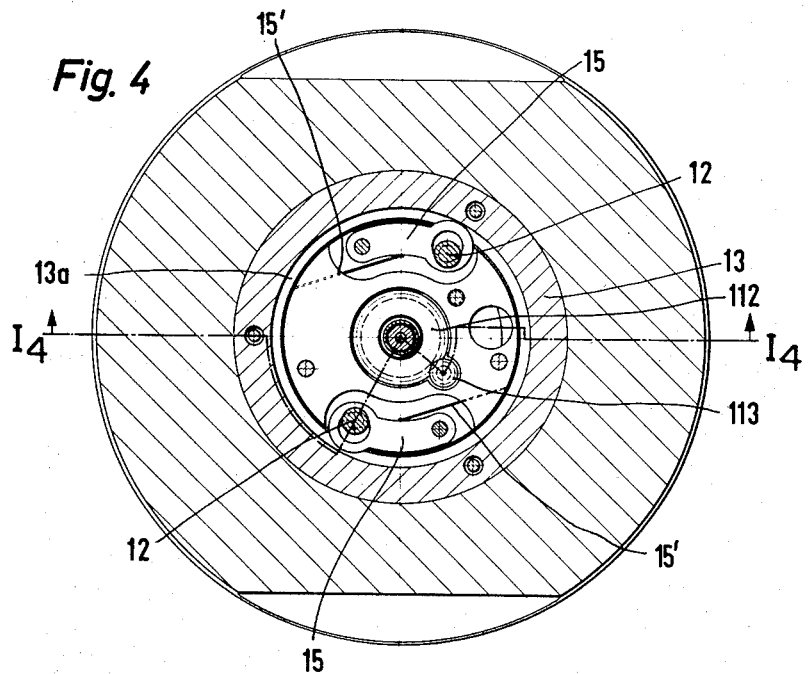
Figure 5:
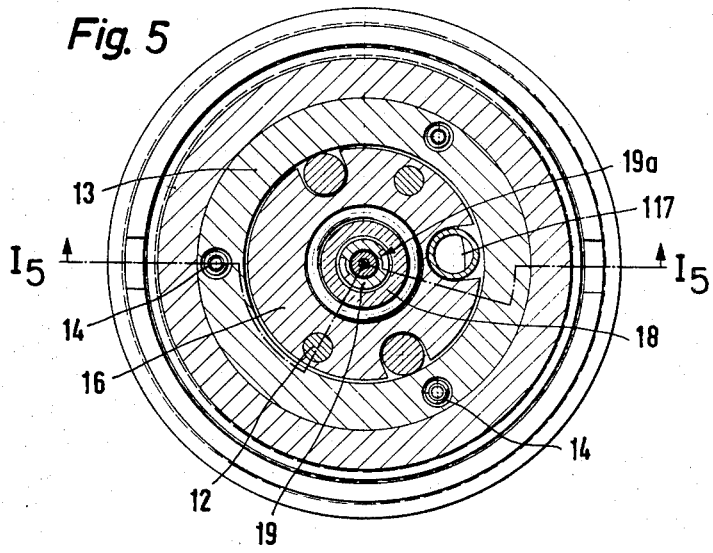
Figure 7B:
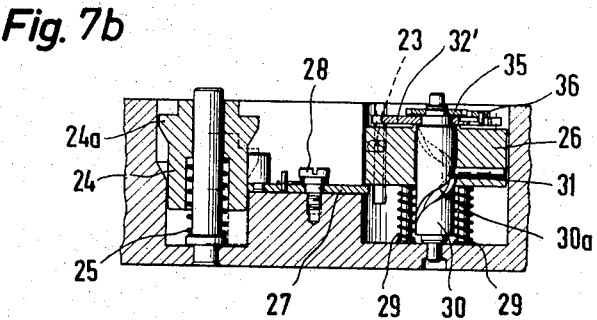
Figure 7C:
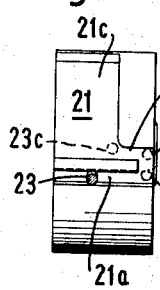
Figure 7A:
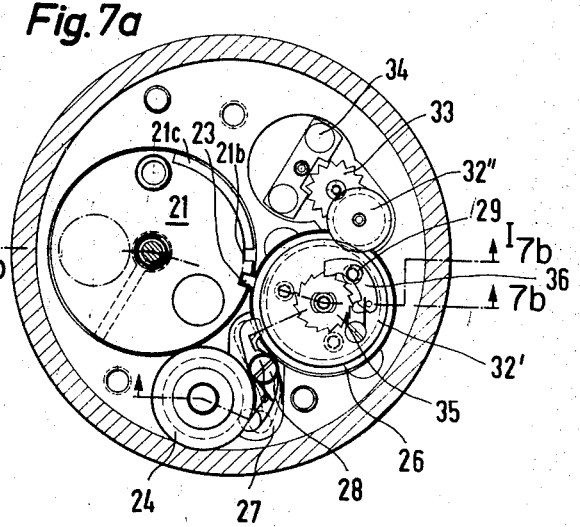

Further objects will be apparent from the following description when considered in connection with the accompanying drawings in which:

FIG. 1 is a longitudinal section of the clockworks fuze,

FIG. 2 is a cross section taken on line 2–2 of FIG. 1 in the direction of the arrows, and along the intersection path $I_2$–$I_2$, FIG. 3 is a partial cross section taken on line 3–3 of FIG. 1, and along the intersection path $I_3$–$I_3$, FIG. 4 is a cross section taken on line 4–4 of FIG. 1 in the direction of the arrows, and along the intersection path $I_4$–$I_4$, FIG. 5 is a cross section taken on line 5–5 of FIG. 1 in the direction of the arrows, and along the intersection path $I_5$–$I_5$, FIG. 6 is a cross section taken on line 6–6 of FIG. 1 in the direction of the arrows, and along the intersection path $I_6$–$I_6$, FIG. 7a is a cross section taken on line 7a–7a of FIG. 1, FIG. 7b is a longitudinal section taken on line 7b–7b of FIG. 7a, and along the intersection path 7b–$I_{7b}$ and, FIG. 7c is an elevation view of the charge carrier-swing member.

Behind the clockwork there is mounted a ring-like continuous weight 13, which is under the force of three compression springs 14 arranged in a circle for feeding purposes. The ring-like continuous weight 13 has a conical inner flange 13a at the front end thereof and at the back part of the ring weight 13, a second continuous weight 16 is slidably provided. On the front or forehead of the continuous weight 16 there are pivotally secured two one-armed locking levers 15 on axially parallel pins. Diagonally opposite there are rigidly secured in the weight 16, the locking bolts or pins 12 which lock with the clockwork, in known manner, by gripping in the anchor. The locking bolts or pins 12 are provided with a ring groove in which the free ends of the locking levers 15 grip and thus the pins 12 are secured against back sliding. Both closure levers 15 are held in contact in the ring grooves in the pins 12 by means of spiral or flat springs 15′.

The fuze has in known manner, as an armature spring, a rod-like torsion spring which in its usual protective tube is connected at its front end to the bottom plate of the clockwork and stretches towards the back in the direction of the fuze bottom as shown in the German Pat. No. 1,179,135.

The protecting tube for the spring extends through the two inertia weights 13 and 16. Around this protecting tube there is mounted a shaft or axle 19 which is provided by sliding on the tube and is secured thereon and in the shaft in the outer surface thereof there is provided a screw threaded groove 19a. On the sleeve 19 there is mounted by sliding action, a sleeve which is forced to the front by a feed spring 11.

Between the inertia weight 16 and the brake sleeve 18 there is provided a strong feed spring 17 which is stronger than the spring 11 of the sleeve 18. A laterally directed pin 100 in the sleeve 18, which extends into the screw threaded groove 19a in the sleeve 19, will force the sleeve 18 back by rotation.

A gear wheel 112 is securely seated on the brake sleeve 18 which cooperates with a drive 113, which for its part grips in an anchor wheel 114 to regulate the motion of an anchor or armature 115. This arrangement will provide a delay structure, known per se, for the brake sleeve 19.

The inertia weight 16 is provided in its back face with an axially parallel blind hole with snap spring 117. This forms a catching pin 116 riveted in the bottom plate and is provided with a press head-like member 116a.

The operation of the described structure is as follows. In the position of rest of the fuze, as known, the clockwork of the time control is arrested or locked by the return closure pin 12. Upon firing, the inertia weight 13 will be moved backward and its conical inner surface or cam 13a will strike against a single arm of the locking lever 15 which grips into the ring groove of the locking pin and swings this lever, against the action of the springs 15′, out of the locking pin 12. At the same time, the inertia weight 16 will return back together with the inertia sleeve 13.

If the firing acceleration is high, then the return impulse will react on the inertia weights 13 and 16 and the sleeve 18. When this is set in motion then the delay or retardation mechanism 100, 19a, 112, 113, 114, 115 will begin to operate and runs so long until the inertia weight 16 is caught at the rear by the press headed pin 116 and is disconnected.

Since the retardation mechanism has an unchanged running time, the safety time limit is definite during the time that the delay mechanism is free to operate.

This time measure is dependent on the acceleration of the projectile and changes therewith. The safety trajectory path of the projectile and therewith the fuze will therefore change also.

The invention therefore strives to hold and automatically set uniformly the safety flight distance without consideration of the acceleration. For this purpose the starting time of the delay mechanism will be automatically shifted such that by high firing acceleration it will be increased, by low acceleration it will be retarded.

For this purpose there is provided a strong feed spring 17 for the inertia weights 16 and 18. This regulates the running time of the known retarding mechanism.

If for instance the acceleration of the projectile is high, then this spring 17 will be pressed together at maximum acceleration so strong that the coils will be adjacent to each other. Thereby the sleeve 18 will be set in backward movement and the retardation mechanism will begin to function, so that the time point for the safety elements to function due to high acceleration will be preshifted. If the projectile acceleration is small, then the strong spring 17 will be only slightly pressed together and this will increase the return movement of the sleeve 18 and thereby the beginning of the starting for the delay mechanism. The time point for ceasing the fuze safety period will thereby also be delayed and the safety time period for the projectile remains the same for higher acceleration.

In such clockwork fuzes to support the safety time by a charge carrier-swinging slide, is a known thought. Also such a safety feature can be carried out in accordance with the invention for automatic adjustment of the acceleration of the projectile.

A modified construction is shown in FIGS. 7a and 7b. The known charge carrier-swing member 21, which in known manner is under the influence of a torsion spring 22, FIG. 1, relative to its rotation is provided with an inertia weight 24 which is held forward on its axle by a feed spring 25. The inertia weight 24 carries in front a conical flange 24a and behind this flange grips one arm of a two-arm lock lever 27 mounted on the bottom of the fuze housing at 28. A closed spring on the pin or screw 28 urges the lever 27 against outward movement. A delay mechanism-inertia weight 26 is seated on a shaft in parallel relationship with the charge carrier-swing member 21 and with the inertia weight 24 so that three compression springs 29 arranged in a circle will force the weight 26 forwardly. The shaft 30 mounted in bearings in the fuze housing, is provided with a spiral groove 30a in which a guide pin 31 laterally projects from the inertia weight 26.

In front on the shaft 30 a ratchet wheel 35 is secured thereon which cooperates with a so-called pawl on ratchet lever 36. This lever 36 seats loosely on the inertia mechanism toothed wheel 32' on the shaft 30. This wheel 32' meshes with a driven toothed wheel 32'' which drives an armature 34 by means of a toothed wheel 33. This structure is similar to a known retarding mechanism.

The retarding-inertia weight 26 has on the outside a laterally projecting pin 23 which projects into a groove in outer surface of the charge carrier-swing member 21 and both coupled to control rotation. The groove in the outside surface of the member 21 serves as well for back movement of the retarding-inertia weight 26 as also a rotation of the charge carrier-swing member.

The operation as to the charge carrier-swing member 21 is as follows.

Upon firing the projectile, the inertia weight 24 will be forced back against its compression spring 25. The conical flange 24a strikes against the outer arm of a two-armed lever 27 at 28 and swings the inner arm out of its locked back position behind the inertia weight 26. This slides back against the pressure of its compression springs 29. Thereby it will rotate following its entry of its guide pin 32 in the spiral groove 30a of the shaft 30. By the rotation the wheel 35 connected therewith will rotate therewith.

Due to this rapid rotation, which occurs due to higher firing acceleration, the teeth of the wheel 35 will ratchet under the arms of the pawl 36 so that the latter and with it the toothed wheel 32'' will remain stationary and the retarding mechanism will not operate.

When now the acceleration of the projectile ceases, then the feed springs 29 will press the inertia weight 26 again toward the front.

Hereby the weight 26 will control the charge carrier-swinging member 21 over the pin 23 in the sharp setting. The lock cone or element 36 now grips the arresting wheel 35 and the retarding mechanism will now operate with delayed action starting up.

If now due to low firing acceleration, the inertia decline of the inertia weight 26 is slow, then the contact of the lock cone in the wheel 35 will be maintained, so that the retarding mechanism will begin its run with retardation while it retards the severe position of the charge carrier. This operates to render the fuze safe before firing.

In summary, during the initiation of downward movement of weight 26, the pin 23 will move downward through slot 21a to a lower position 23a, shown in phantom line in FIG. 7a.

The torsion spring 22 will rotate swinging member 21 so as to displace the pin 23 to the phantom line position 23b at the base of slot portion 21b.

Upward movement of weight 26, under the influence of springs 29, will displace the pin 23 to the circumferentially extending slot zone 21c. The torsion spring 22 will now rotate the swinging member 21 through the circumferential extent permitted by the slot portion 21c. This latter movement of swinging member 21 serves to place the component 21 in an arming or actuating condition, consistent with well-recognized technology in the fuze art and generally consistent with the arming concepts featured in Kaiser et al. Pat. No. 3,124,074.

As will be appreciated, under conditions of high acceleration the retarding influence of mechanism 35–36 will be bypassed by the rapid downward movement of the weight 26 and the thus induced "free wheeling" of the cog wheel 35. Under conditions of low acceleration, the retarding mechanism 35–36 will serve to control the rate of movement of the weight 26 during downward as well as upward movements.

Those skilled in the art and familiar with the disclosure of this invention may envision additions, deletions, substitutions or other modifications which would fall within the purview of the appended claims.

We claim:

1. A clockwork time fuze comprising:
   retarding means;
   motor means for actuating said retarding means, said motor means being operable to drive said retarding means;
   actuating means for imparting actuating energy to said motor means;
   said actuating means, motor means, and retarding means defining a drive train for transmitting energy to said retarding means;
   acceleration responsive means connected in series relation in said drive train and operable to control the transmission of energy through said drive train to said retarding means in accordance with acceleration imparted to said fuze;
   said acceleration responsive means being operable to define alternately operable, first and second acceleration force transmitting conditions between said actuating means and said motor means;
   said first acceleration force transmitting condition being responsive to relatively high acceleration and operable to cause a relatively high rate of movement of said actuating means at least partially independent of said retarding means; and
   said second acceleration force transmitting condition being responsive to relatively low acceleration and operable to cause a relatively low rate of movement of said actuating means governed by said retarding means.

2. A clockwork time fuze comprising:
   retarding means;
   motor means for actuating said retarding means, said motor means being operable to drive said retarding means;
   actuating means for imparting actuating energy to said motor means;
   said actuating means, motor means and retarding means defining a drive train for transmitting energy to said retarding means;
   acceleration responsive means connected in series relation in said drive train and operable to control the transmission of energy through said drive train to said retarding means in accordance with acceleration imparted to said fuze;

said acceleration responsive means including kinetic energy absorbing means interposed in said drive train between said actuating means and said motor means;

said motor means including sleeve means operable to impart motion to said retarding means in response to axial movement of said sleeve means;

said actuating means including an acceleration responsive mass mounted coaxially in relation to said sleeve means; and said kinetic energy absorbing means including coil spring means interposed axially between said mass and said sleeve means and operable to compress in response to accelerating forces imposed on said fuze.

3. A clockwork time fuze comprising:

retarding means;

motor means for actuating said retarding means, said motor means being operable to drive said retarding means;

actuating means for imparting actuating energy to said motor means;

said actuating means, motor means and retarding means defining a drive train for transmitting energy to said retarding means;

acceleration responsive means connected in series relation in said drive train and operable to control the transmission of energy through said drive train to said retarding means in accordance with acceleration imparted to said fuze; and said acceleration responsive means including acceleration responsive clutch means interposed in said drive train between said motor means and said retarding means.